W. J. METTLER.
RESILIENT WHEEL.
APPLICATION FILED APR. 8, 1912.

1,051,431.

Patented Jan. 28, 1913.

WITNESSES:
Thomas Colson
R. W. Stone

INVENTOR:
William J. Mettler,
By Joshua R. H. Potts
His Attorney.

UNITED STATES PATENT OFFICE.

WILLIAM J. METTLER, OF DE KALB, ILLINOIS.

RESILIENT WHEEL.

1,051,431.  Specification of Letters Patent.  Patented Jan. 28, 1913.

Application filed April 8, 1912.  Serial No. 689,248.

*To all whom it may concern:*

Be it known that I, WILLIAM J. METTLER, a citizen of the United States, and a resident of the city of De Kalb, county of Dekalb, and State of Illinois, have invented certain new and useful Improvements in Resilient Wheels, of which the following is a specification.

My invention relates to resilient wheels, and the object of my improvement is to provide a device of this character which will be simple of construction and efficient in operation.

The invention consists in the combinations and arrangements of parts hereinafter described and claimed.

The invention will be best understood by reference to the accompanying drawing forming a part of this specification, and in which—

Figure 1:
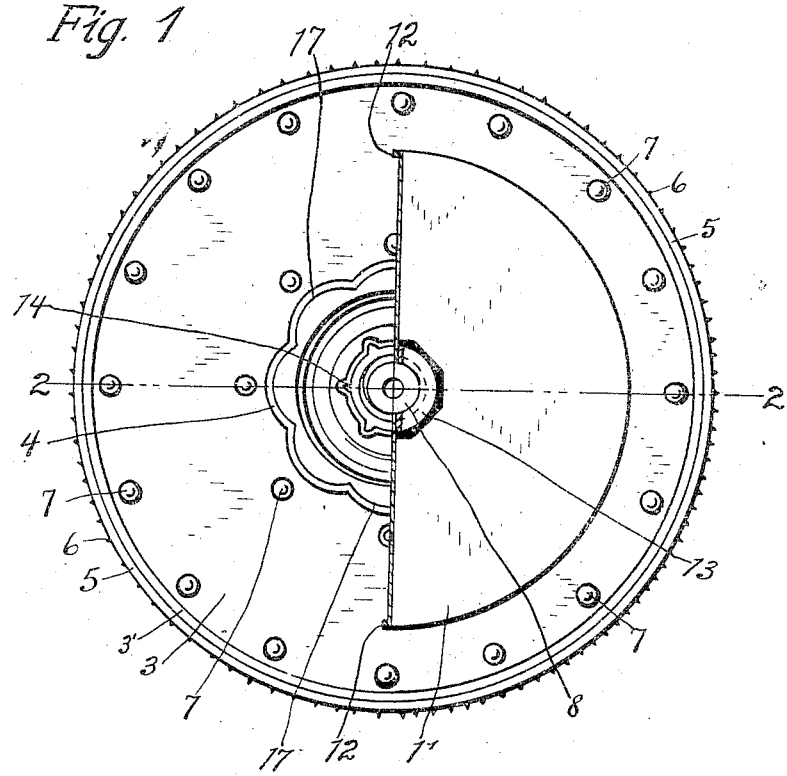
Figure 2:
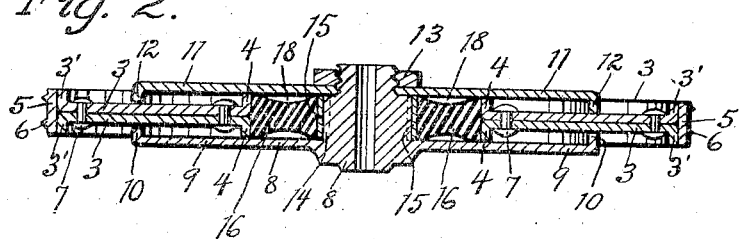

Figure 1 is an elevation of a wheel built in accordance with my invention, having a portion removed, and Fig. 2 is a section of the same taken on a line 2—2 in Fig. 1.

The preferred form of construction, as illustrated in the drawing, comprises a wheel proper made of two pieces of annular sheet metal 3 having turned edges 3' to form a felly and edges 4 turned to form a supporting member and engage a portion of the hub. A tire 5 is secured on the felly of said wheel and provided with points 6 to increase the tractability of the wheel. The annular members 3 are secured together by means of rivets 7.

A hub 8 is provided with an integrally formed disk 9 which is provided with a turned edge 10 to engage one of the members 3. On the opposite end of the hub 8 is removably secured a second disk 11 having a turned edge 12 to engage the other of said members 3. Said removably secured disk is secured to said hub by means of a threaded nut 13. Said hub 8 is provided with longitudinal teeth or ribs 14 on its periphery. Around the hub 8 and ribs 14 is removably secured a sleeve 15 formed to fit snugly and turn with said hub. A resilient annular member 16 is secured on the sleeve 15 and removably secured in longitudinal recesses 17 which are formed in the supporting members 4 in a manner that the wheel proper will be rotated with the hub portion 8. The purpose of the sleeve 15 is to allow the resilient member 16 to be easily removed from said hub 8 when it is so desired. Said resilient member 16 is provided with annular slots 18 on its two sides in order to allow its giving when the wheel contacts an obstacle. It will be readily seen that the members 3 will be free to move radially in the guide formed by the edges 10 and 12 of the disks 9 and 11, also, a second supporting surface is formed between the supporting edges 4 and the inner sides of the disks 9 and 11. This will give the wheel a great resiliency and have the advantage of reducing the wear on the resilient part of the wheel.

While I have illustrated and described the preferred form of construction for carrying my invention into effect, this is capable of variation and modification without departing from the spirit of the invention. I, therefore, do not wish to be limited to the exact details of construction set forth, but desire to avail myself of such variations and modifications as come within the scope of the appended claims.

Having described my invention, what I claim as new and desire to secure by Letters Patent, is:

1. A wheel comprising a wheel proper having a secondary hub; a primary hub having longitudinal ribs; a sleeve fitted to and removably secured on said primary hub and its longitudinal ribs; an annular resilient member rigidly secured on said sleeve and removably secured in said secondary hub; and members on said primary hub to receive end thrust from the wheel proper, substantially as described.

2. A wheel comprising a wheel proper having its felly, spokes and supporting member formed of two like pieces of sheet metal secured together; longitudinal recesses formed in the supporting surface of said supporting member; a hub having longitudinal ribs; a sleeve fitted around and removably secured on said hub and its longitudinal ribs; an annular resilient member rigidly secured to said sleeve and removably secured in the supporting member of said wheel proper; annular recesses in the sides of said resilient member; and two disks, each having its turned edge extending toward the other disk, provided on said hub to receive end thrust from said wheel proper, substantially as described.

In witness whereof I have signed my name to this specification in the presence of two subscribing witnesses.

WILLIAM J. METTLER.

Witnesses:
JOHN C. KILLIAN,
MAY RONAN.